United States Patent
Nagata

(10) Patent No.: US 9,569,156 B2
(45) Date of Patent: Feb. 14, 2017

(54) APPARATUS, METHOD, AND MEDIUM ALLOCATE DIVIDED JOBS TO A PLURALITY OF RASTERIZING UNITS

(71) Applicant: CANON KABUSHIKI KAISHA, Tokyo (JP)

(72) Inventor: Tomohiro Nagata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/939,974

(22) Filed: Nov. 12, 2015

(65) Prior Publication Data

US 2016/0139859 A1 May 19, 2016

(30) Foreign Application Priority Data

Nov. 17, 2014 (JP) ................................ 2014-233130

(51) Int. Cl.
*G06F 3/12* (2006.01)
*G06K 15/02* (2006.01)

(52) U.S. Cl.
CPC .............. *G06F 3/126* (2013.01); *G06F 3/124* (2013.01); *G06F 3/1212* (2013.01); *G06F 3/1285* (2013.01); *G06K 15/1823* (2013.01); *G06K 15/1836* (2013.01)

(58) Field of Classification Search
CPC ........ G06F 3/126; G06F 3/122; G06F 3/1212; G06K 15/1836
See application file for complete search history.

(56) References Cited

U.S. PATENT DOCUMENTS

| | | | | |
|---|---|---|---|---|
| 2008/0270402 A1* | 10/2008 | Inoue | .................... | G06F 3/1212 |
| 2012/0133984 A1* | 5/2012 | Hayakawa | ............ | G06F 3/1211 |
| | | | | 358/1.16 |
| 2012/0250053 A1* | 10/2012 | Mitsubori | ............. | G06F 3/1213 |
| | | | | 358/1.13 |
| 2014/0268214 A1* | 9/2014 | Soriano | ................... | G06F 3/126 |
| | | | | 358/1.15 |
| 2014/0268216 A1* | 9/2014 | Soriano | ............. | G06K 15/1803 |
| | | | | 358/1.15 |

FOREIGN PATENT DOCUMENTS

JP   2004-164445 A   6/2004

* cited by examiner

*Primary Examiner* — Iriana Cruz
(74) *Attorney, Agent, or Firm* — Canon USA, Inc. IP Division

(57) ABSTRACT

A control apparatus includes a first predicting unit configured to predict a rasterizing time for each of predetermined units of processing of a first print job, an allocating unit configured to allocate a plurality of divided jobs acquired by dividing the first print job into the units of the processing to a plurality of rasterizing units, an acquiring unit configured to acquire an actual value of a rasterization speed of each of the rasterizing units, and a second predicting unit configured to predict completion times of rasterization processing of a second print job in each of the rasterizing units based on the actual values of the rasterization speed of each of the rasterizing units and processing states of each of the rasterizing units. In this case, the allocating unit divides and allocates the print jobs to each of the rasterizing units based on the prediction results.

14 Claims, 13 Drawing Sheets

| RASTERIZING UNIT NUMBER | SPEED [ppm] | NUMBER OF PAGES LEFT | REMAINING TIME [sec] |
|---|---|---|---|
| 1 | 30 | 13 | 50 |
| 2 | 35 | 7 | 48 |
| 3 | 40 | 4 | 51 |
| 4 | 27 | 8 | 49 |

| RASTERIZING UNIT NUMBER | RASTERIZATION SPEED HISTORY [page/sec] | | | | NUMBER OF INCOMPLETE PAGES |
|---|---|---|---|---|---|
| | v0 | v1 | ... | vN-1 | |
| 1 | 1.0 | 1.1 | ... | 0.9 | 13 |
| 2 | 1.2 | 1.3 | ... | 2.0 | 7 |
| 3 | 0.7 | 0.6 | ... | 0.7 | 4 |
| 4 | 0.5 | 0.4 | ... | 0.5 | 8 |

Monitoring Information (201, 202, 203, 204)

FIG. 14

| RASTERIZING UNIT NUMBER | SPEED [ppm] | NUMBER OF PAGES LEFT | REMAINING TIME [sec] |
|---|---|---|---|
| 1 | 30 | 13 | 50 |
| 2 | 35 | 7 | 48 |
| 3 | 40 | 4 | 51 |
| 4 | 27 | 8 | 49 |

APPARATUS, METHOD, AND MEDIUM ALLOCATE DIVIDED JOBS TO A PLURALITY OF RASTERIZING UNITS

BACKGROUND

Field of the Disclosure

The present disclosure relates to a control apparatus, a control method, and a program for an image processing apparatus having a plurality of image units of processing.

Description of the Related Art

There is known a method in a printing apparatus such as a printer has been known which includes dividing a print job, wherein the divided printed jobs are distributed to and processed in parallel by a plurality of rasterizing devices for increasing the speed of the rasterization of the print job. For example, the method may include predicting a rasterizing time for a print job, dividing the print job and distributing the divided print jobs to rasterizing devices such that the rasterizing processes in the rasterizing devices can complete appropriately at the same time. However, accurate prediction of the rasterizing times for a print job is difficult, and a prediction error may result in differences in time of completion between rasterizing devices even though the print jobs have been distributed such that the rasterization processes of the divided print jobs can complete approximately at the same time. FIG. 16A illustrates an exemplary time chart for rasterizing devices. As illustrated in FIG. 16A, when a difference occurs between times of completion of the rasterizing processes, the longest completion time of the rasterizing device B is determined as the rasterization completion time of the whole print job. In a case where print jobs are sequentially processed, prediction errors as described above may be accumulated, resulting in large differences in rasterization completion time between the rasterizing devices, as illustrated in FIG. 16B. Therefore, such a distribution method based on only the predicted rasterizing times may not sufficiently increase the speed of the rasterization of a print job.

Accordingly, a method has been proposed (see Japanese Patent Laid-Open No. 2004-164445) which determines a distribution ratio based on CPU types, CPU activity ratios and performances and resource availability such as a free memory space of devices.

Here, in some cases, a series of processes such as a process for receiving job data, an image correction process, an RIP processing of, for example, PDL, a process of rotating and pagination of bitmap data, and a process for transmitting the bitmap data may be sequentially executed for each processing unit such as a page within rasterizing devices. Then, as illustrated in FIGS. 17A to 17C, these processes may be concurrently executed on different pages in parallel. FIGS. 17A to 17C illustrate time charts for one rasterizing unit. As illustrated in FIGS. 17A to 17C, in one rasterizing unit, different types of processes but not the same type of processes are executed on a plurality of pages in parallel. In other words, one receiving process and another receiving process are not allowed to be executed in parallel. One RIP process and another RIP process are not executed in parallel. Similarly, the rotation/pagination process and another rotation/pagination process and one transmitting process and another transmitting process are not executed in parallel. The image correction process is executed only after the receiving process, the RIP process after the image correction process, the rotation/pagination process after the RIP process, and the transmitting process after the rotation/pagination process. When the aforementioned processes are executed, the activity ratios of resources such as CPUs and memory depend on the concurrency of the processes, instead of the rasterizing times. Thus, a higher activity ratio of a resource may not necessarily result in a longer rasterizing time. As illustrated in FIG. 17B, when processing a print job with a high rasterization load, the processes may take a longer time and consequently a longer rasterizing time while the concurrency of the processes may decrease, and the activity ratios of resources may decrease. Conversely, when processing a print job with a lower rasterization load, the processes may take a shorter time and consequently a shorter rasterizing time while the concurrency of the processes may increase, and the activity ratios of resources may increase. In other words, the time period increases in which the activity ratio of the resource for the rasterizing units performing the processes illustrated in FIG. 17C is higher than the activity ratio of the resource for the rasterizing units performing the processes illustrated in FIG. 17B. Therefore, according to the method disclosed in Japanese Patent Laid-Open No. 2004-164445, the distribution ratios for the rasterizing units in FIG. 17B are set lower than the distribution ratio for the rasterizing units in FIG. 17C. As a result, with distribution of jobs based on the activity ratios of a resource as in Japanese Patent Laid-Open No. 2004-164445, it is not possible to make the difference in the time of completion of rasterization as small as possible.

SUMMARY

A control apparatus includes a first predicting unit configured to predict a rasterizing time for each of a plurality of predetermined units of processing of a first print job, an allocating unit configured to allocate a plurality of divided jobs acquired by dividing the first print job into the units of processing to a plurality of rasterizing units configured to perform image processing, an acquiring unit configured to acquire an actual value of a rasterization speed of each of the rasterizing units, and a second predicting unit configured to predict completion times of rasterization processing of a second print job in each of the rasterizing units based on the actual values of the rasterization speed of each of the rasterizing units acquired by the acquiring unit and processing states of each of the rasterizing units after start of the rasterization processing of the second print job, the second print job having been allocated before the first print job. In this case, the allocating unit divides and allocates the print jobs to each of the rasterizing units so as to reduce a difference in completion time of processing in the rasterizing units based on the prediction results provided by the first predicting unit and the prediction results provided by the second predicting unit.

Further features of the present invention will become apparent from the following description of exemplary embodiments with reference to the attached drawings.

BRIEF DESCRIPTION OF THE DRAWINGS

FIG. 14 illustrates a display example in a user interface unit according to the first embodiment.

DESCRIPTION OF THE EMBODIMENTS

First Embodiment

Embodiments of the present invention will be described in detail below with reference to the attached drawings. It should be understood that relative arrangements and forms of components according to the embodiments are given for illustration purpose only, and it is not intended that they limit the scope of the present invention.

According to this embodiment, a printing apparatus will be described as an example of a control apparatus. The printing apparatus according to this embodiment is not limited to a dedicated apparatus specific to a printing function but may include a multi-function peripheral having a complex including a printing function and other functions and a production apparatus which forms an image and/or a pattern on a print paper, for example.

Figure 1:
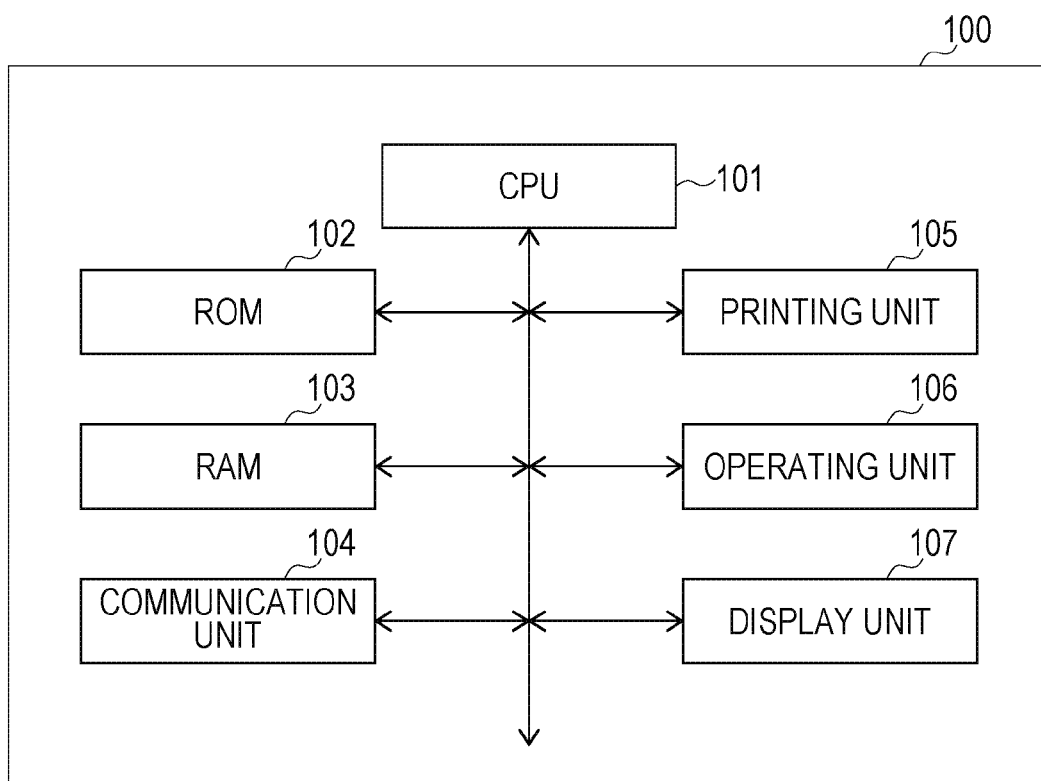
FIG. 1 illustrates a hardware configuration of a printing apparatus according to a first embodiment.

FIG. 1 is a schematic block diagram illustrating a hardware configuration of the printing apparatus according to the first embodiment. A printing apparatus 100 includes, as illustrated in FIG. 1, a central processing unit (CPU) 101, a ROM 102, a RAM 103, a communication unit 104, a recording unit 105, an operating unit 106, and a display unit 107 connected to each other via a system bus.

The CPU 101 controls the RAM 103, communication unit 104, recording unit 105, operating unit 106 and display unit 107 in accordance with programs stored in the ROM 102.

The ROM 102 stores control programs to be executed by the CPU 101 and fixed data necessary for operations in the printing apparatus 100. For example, the ROM 102 stores a program for executing a record (printing) process in the printing apparatus 100.

The RAM 103 is usable as a working area for the CPU 101, a temporary storage region for various received data and may store setting data. Print data (print data) received from an external apparatus 10, that is, print data to be recorded (printed) in the recording unit 105 are temporarily stored in the RAM 103.

The communication unit 104 controls communication between an external apparatus and the printing apparatus 100.

The recording unit (printing unit) 105 has, for example, a recording unit including an ink-jet system print head, color inks, carriages and a print paper conveying mechanism and an electric circuit including an ASIC configured to generate recording pulses based on print data.

The operating unit 106 includes buttons such as a power button and a reset button and is usable by a user for operating the printing apparatus 100.

Figure 2:
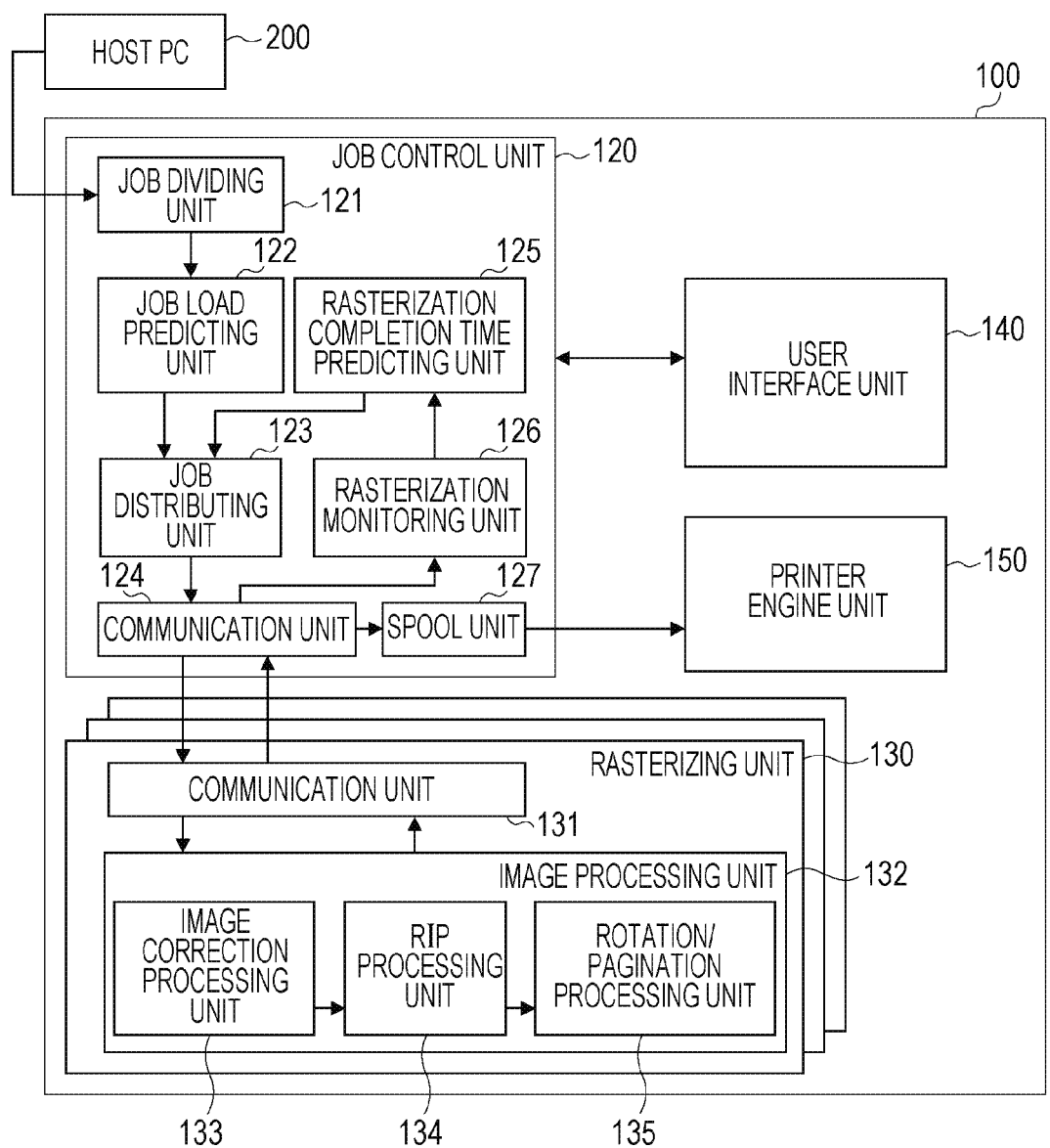
FIG. 2 is a block diagram for explaining a configuration of control in the printing apparatus according to the first embodiment.

The display unit 107 may include a touch-panel liquid crystal display, for example, and displays a state and settings of the printing apparatus 100. It should be noted that a user inputs a setting through the display unit 107. The display unit 107 displays a received operation instruction and an indication of an apparatus state. FIG. 2 is a block diagram for explaining a configuration of control in the printing apparatus according to this embodiment. The printing apparatus 100 according to the first embodiment has a job control unit 120, a plurality of rasterizing units 130, a user interface unit 140, and a printer engine unit 150. Each of these components may be implemented as hardware components mounted in the control apparatus 108 as in FIG. 1 or may be implemented through a collaboration of hardware and software, for example.

The job control unit 120 has a job dividing unit 121, a job load predicting unit 122, a job distributing unit 123, a communication unit 124, a rasterization-completion-time predicting unit 125, a rasterization monitoring unit 126, and a spool unit 127. Each of the rasterizing units 130 has a communication unit 131 and an image processing unit 132.

The job control unit 120 is configured to process PDL print job data, for example, received from an external apparatus 200 such as a PC and print them on a roll sheet, for example. The job control unit 120 receives a print job from the external apparatus 200 and generates a command and data based on details of the print job or an instruction from the user interface unit 140. The job control unit 120 transmits the generated command and data to the rasterizing units 130 through the communication unit 124.

The rasterizing unit 130 executes image processing thereon, and the resulting bitmap data are transmitted from the rasterizing units 130 to the job control unit 120 through the communication unit 131.

The job control unit 120 receives the rasterized bitmap data through the communication unit 124 and then stores them in the spool unit 127. Then, the job control unit 120 causes the rasterized data to be transmitted from the spool unit 127 to the printer engine unit 150 and printed.

The print job data received from the external apparatus 200 are stored in the job dividing unit 121. The job dividing unit 121 divides the received print job data into jobs in units of processing to be designated to the rasterizing units 130. The processing unit may be a page unit or a band unit acquired by further dividing a page unit, for example. According to this embodiment, the case where a page unit is further divided will be described as an example.

The job load predicting unit 122 analyzes contents of each page data piece divided by the job dividing unit 121 to predict a time necessary for rasterizing them and notifies the predicted time to the job distributing unit 123.

Figures 3, 4:
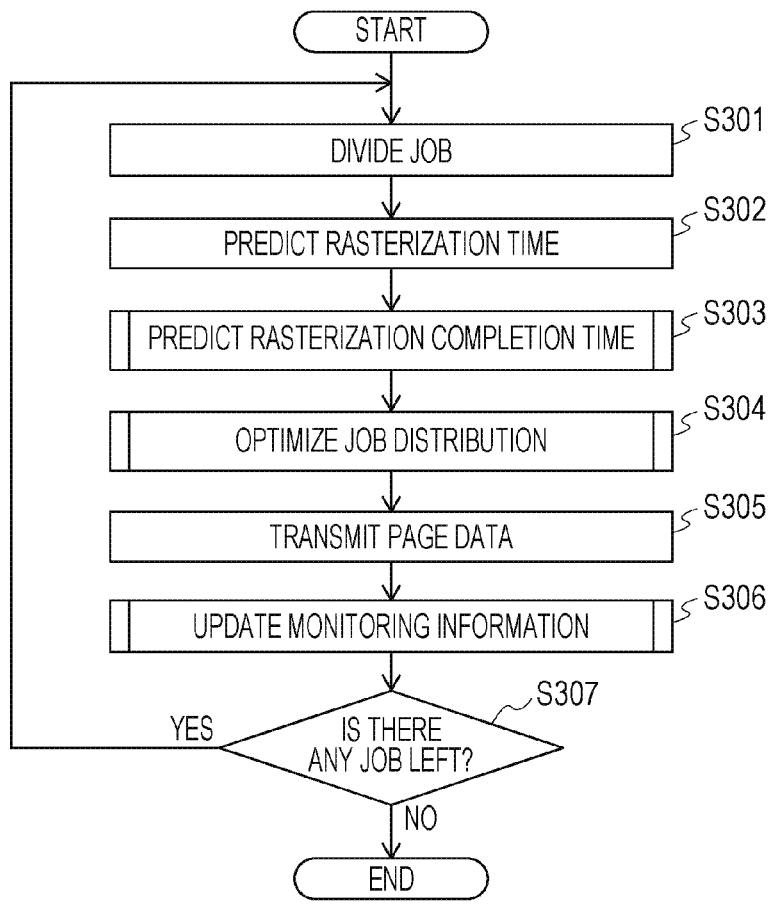
FIG. 3 illustrates an example of monitoring information in a rasterization monitoring unit according to the first embodiment.
FIG. 4 is a flowchart illustrating a flow of first processing in a job control unit according to the first embodiment.

The rasterization monitoring unit 126 has a memory unit configured to store monitoring information indicative of processing states of the rasterizing units 130 and updates the monitoring information in response to an instruction from the communication unit 124. FIG. 3 illustrates exemplary monitoring information in a case where four rasterizing units 130 are provided. The monitoring information 201 contains a rasterizing unit number 202, a rasterization speed history 203, and a number of incomplete pages 204 with respect to each of rasterizing units 130. Here, the rasterization speed refers to the number of bitmap data sets in page/sec, for example, received by the communication unit 124 in a unit period of time from the rasterizing unit 130. The most recent N measurement results of the rasterization speed are stored as records. According to this embodiment, the rasterization speed is measured at every completion of rasterization of one page, that is, every time the job control unit 120 receives the rasterized bitmap data through the communication unit 131. The measurement method will be described in detail below. The term "incomplete page" refers to a page which has already been allocated to one of the rasterizing units 130 but whose bitmap data have not yet been transmitted to the job control unit 120.

The rasterization-completion-time predicting unit 125 refers to the monitoring information 201, predicts a time period (rasterization completion time) necessary until the completion of the rasterization of an incomplete page or pages for each of the rasterizing units 130, and notifies it to the job distributing unit 123.

The job distributing unit 123 determines distribution ratios of the print jobs to the rasterizing units 130 based on the rasterization completion time prediction values notified from the rasterization-completion-time predicting unit 125. Then, the combination of pages is optimized based on the rasterizing time prediction values and the distribution ratios notified from the job load predicting unit 122 to generate page groups to be allocated to the rasterizing units 130. According to this embodiment, a print job is divided into a plurality of units of processing as divided jobs to generate page groups to be allocated to the rasterizing units. However, in a case where the processing unit is a band, band groups are generated. In other words, the job distributing unit 123 allocates one or more pages to one rasterizing unit 130, and a plurality of rasterizing units 130 (four rasterizing unit according to this embodiment) perform image processes on one print job.

Finally, the communication unit 131 is instructed to start rasterization on the page groups. The communication unit 131 transmits data of a page group of one or more pages to the corresponding rasterizing unit 130 based on the instruction from the job distributing unit 123. The rasterization monitoring unit 126 is instructed to update the monitoring information 201.

The rasterizing unit 130 generates bitmap data for printing by rasterizing a command and data transmitted from the job control unit 120. The rasterizing unit 130 then transmits the bitmap data to the job control unit 120 through the communication unit 131. The communication unit 131 in each of the rasterizing units 130 receives the data of a page group transmitted from the job control unit 120. The image processing unit 132 rasterizes the received page. The image processing unit 132 includes an image correction processing unit 133, an RIP processing unit 134, and a rotation/pagination processing unit 135. The image correction processing unit 133 performs an image correction process designated by a command on image data included in the page data. The RIP processing unit 134 interprets the PDL of the page data and performs a logical drawing process thereon for conversion to bitmap data. The rotation/pagination processing unit 135 executes rotation/pagination on bitmap data in accordance with settings for the print job to generate final processed data (bitmap data) for printing. The settings for a print job are included in data on each page group when the job dividing unit 121 divides a job. The communication unit 131 transmits the generated bitmap data to the communication unit 124 within the job control unit 120.

Figure 16A:
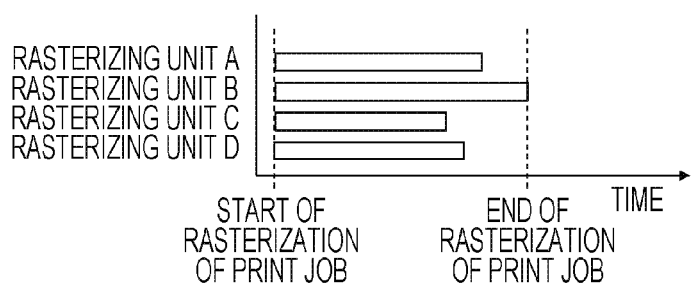
FIGS. 16A and 16B illustrate exemplary time charts for rasterizing units based on distribution processing in the past.
Figure 16B:
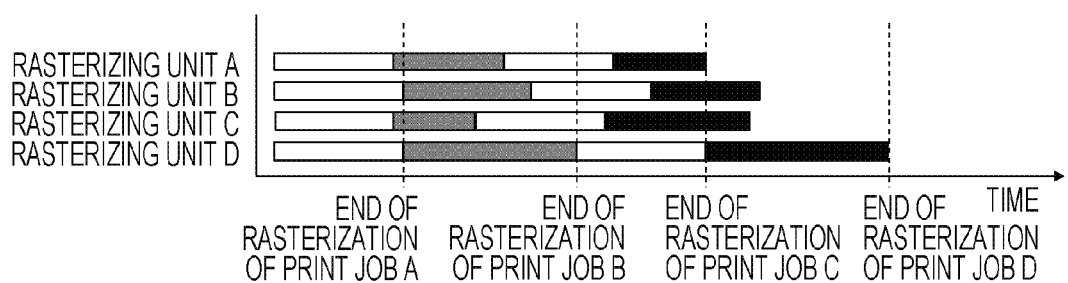
Figure 17A:
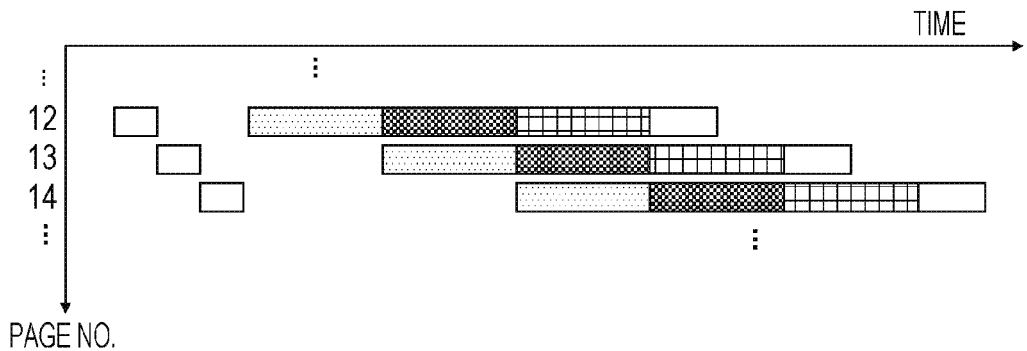
FIGS. 17A and 17B illustrate exemplary time charts based on image processing in the rasterizing units.
Figure 17B:
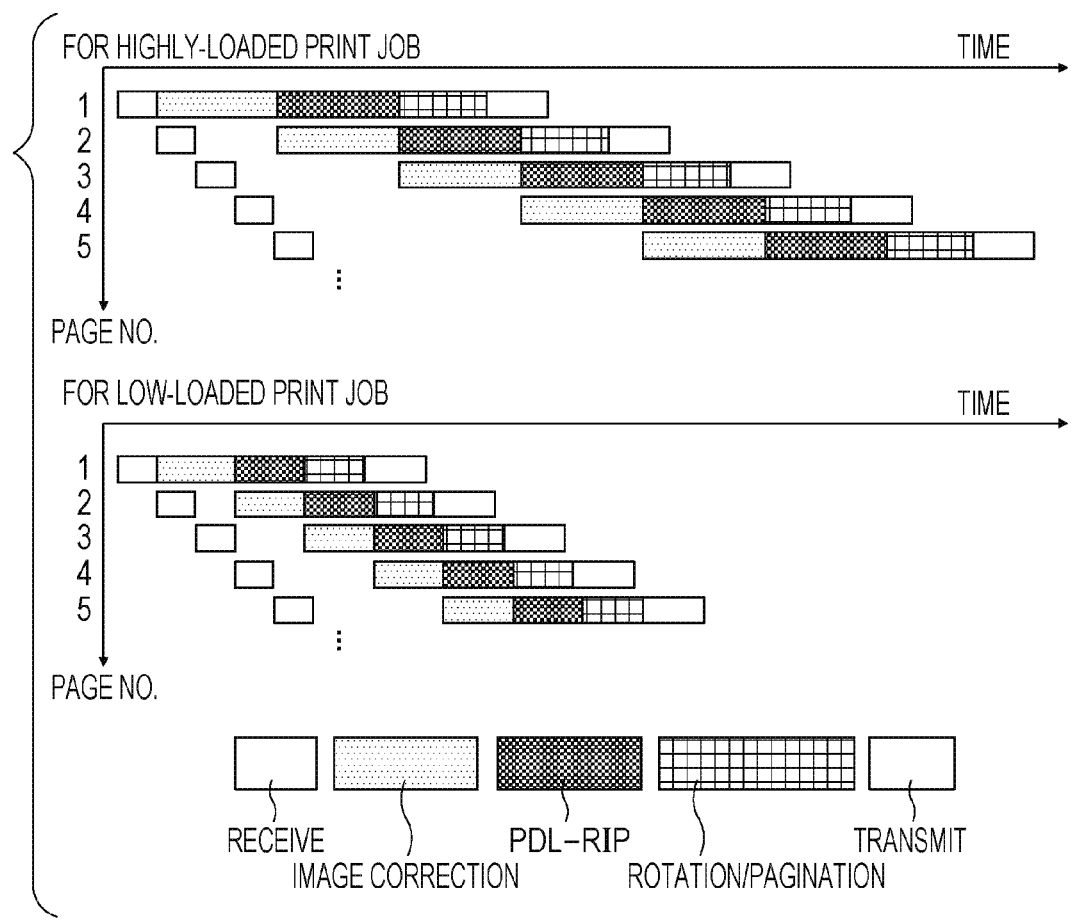

As described above with reference to FIGS. 16A and 16B, one rasterizing unit may not execute one type of processing on a plurality of pages in parallel but may perform different types of processing thereon in parallel. In other words, one receiving process and another receiving process may not be executed in parallel, and one RIP process and another RIP process, one rotation/pagination process and another rotation/pagination process, one transmitting process, and another transmitting process may not be executed in parallel. The image correction process may be executed only after the receiving process, and the RIP process may be executed only after the image correction process. The rotation/pagination process may be executed only after the RIP process. The transmitting process may be executed only after the rotation/pagination process. The processing from the reception to the transmission of data of a page group as described above is performed in page units, and one rasterizing unit executes different types of processing on different pages simultaneously. In other words, the image correction process, RIP process and rotation/pagination process are executed in parallel within the rasterizing unit 130. For example, the rotation/pagination process on the first page, the RIP process on the second page, and the image correction process on the third page are executed in parallel. It should be noted that pages to be allocated to one rasterizing unit are not necessarily serial pages and may be pages that are not serial, details of which will be described below.

While the image processing unit 132 according to this embodiment includes the image correction processing unit 133, RIP processing unit 134, and rotation/pagination processing unit 135, the present invention is not limited thereto. For example, different types of processing for generating bitmap data by rasterizing are also applicable.

The communication unit 124 stores bitmap data received from the rasterizing unit 130 in the spool unit 127. At this time, the communication unit 1240 instructs the rasterization monitoring unit 126 to update the monitoring information 201.

The job control unit 120 transmits bitmap data within the spool unit 127 to the printer engine unit 150 in printing order. The printer engine unit 150 converts the received bitmap data to CMYK, for example, which is a color space supported by the printer engine unit 150 and may perform binarization processing as necessary. The data having undergone the color conversion processing is printed on a medium.

The user interface unit 140 corresponds to the operating unit 106 and display unit 107 illustrated in FIG. 1.

Figure 5:
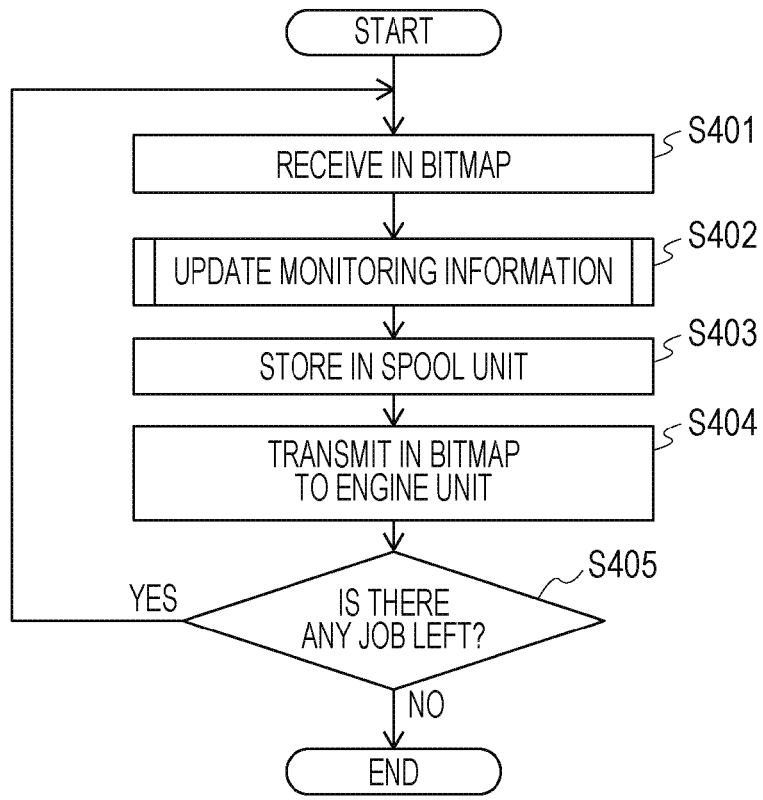
FIG. 5 is a flowchart illustrating a flow of second processing in the job control unit according to the first embodiment.

The printer engine unit 150 is a component of the recording unit 105 and performs processing such as the color conversion on bitmap data transmitted from the job control unit 120 and then performs printing on a medium such as a roll sheet. Now, the processing to be performed by the job control unit 120 will be described with reference to FIGS. 4 to 8. The processing illustrated in FIGS. 4 to 8 may be executed by the CPU 101 by reading out and executing a program stored in the ROM 102 to and in the RAM 103, for example. FIG. 4 illustrates a control flow of processing for transmitting data from the job control unit 120 to the rasterizing unit 130. FIG. 5 illustrates a control flow of processing for receiving data from the rasterizing unit 130 by the job control unit 120.

First, with reference to FIG. 4, first processing to be performed by the job control unit 120 after a print job is received will be described. More specifically, a processing flow for transmitting data from the job control unit 120 to the rasterizing unit 130 will be described.

After the job control unit 120 receives a print job (print data), the job dividing unit 121 divides the print job into units of processing (page units according to this embodiment) for the rasterizing units 130 (S301).

Next, the job load predicting unit 122 analyzes the print jobs divided into units of processing, that is, analyzes print data of each page (hereinafter, also called page data) according to this embodiment and predicts a time period necessary for rasterizing them (S302). The predicted time is notified to the job distributing unit 123. Here, the predicting method to be implemented by the job load predicting unit is not particularly limited. A prediction formula derived from parameters in advance may be used. The parameters may be, for example, the number of objects included in page data, the type of object, the data size of the object, the size of the page data, and the resolution of the page data, and the prediction may be performed by using one or more of the parameters. It should be noted that when many objects are included in page data, for example, it is predicted that a longer time period may be required for the rasterization. When the type of object is an image or graphic, it is predicted that the time period required for the rasterization may be longer than that for text. When the size of object is large (such as a case where the width, height, or resolution of an image is large), it is predicted that a long time period may be required for the rasterization. When the size and resolution of page data are large and high, it is predicted that a long time period may be required for the rasterization. For example, predicted times may be preset in accordance with parameters such as X seconds for A4 size with 600 dpi and Y seconds for A3 size with 1200 dpi. Then, the time may be predicted based on the parameters corresponding to a given page. Other publicly known prediction methods are also applicable.

Next, the rasterization-completion-time predicting unit 125 obtains the monitoring information 201 from the rasterization monitoring unit 126 and predicts a rasterization completion time of each of the rasterizing units 130 based on the obtained monitoring information (S303). The rasterization completion times are predicted after the rasterization of one previous print job starts and before the rasterization of one previous print job completes. The rasterization-completion-time predicting unit 125 notifies the prediction results to the job distributing unit 123.

Next, the job distributing unit 123 optimizes combinations of pages to generate page groups to be allocated to the rasterizing units 130 (S304). The optimization of combinations of pages will be described below in detail.

The communication unit 124 transmits data of a page group to each of the rasterizing units 130 (S305).

The communication unit 124 instructs the rasterization monitoring unit 126 to update the monitoring information 201 (S306). The update of monitoring information will be described below in detail.

Figure 6:
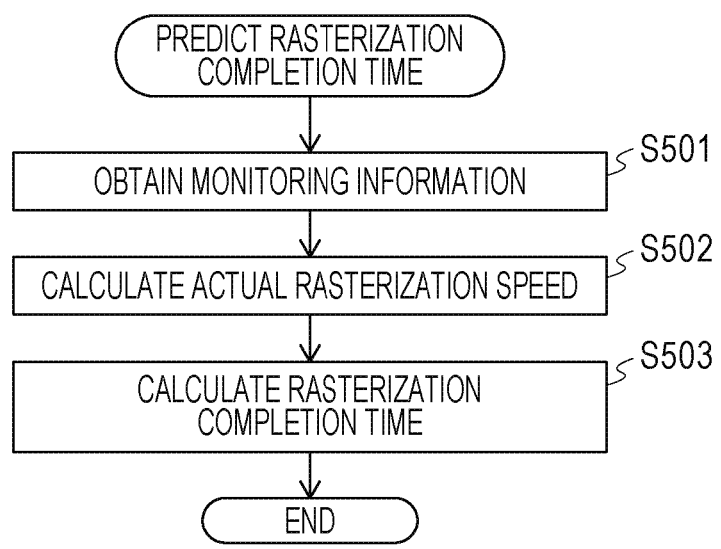
FIG. 6 is a flowchart of control over a process for predicting a rasterization completion time according to the first embodiment.

The job dividing unit 121 judges whether or not there is a print job subsequent to the print job in processing (S307). If so (Yes in S307), the processing returns to S301 where the next print job is processed. If not (No in S307) on the other hand, the transmitting process to the rasterizing unit 130 ends. With reference to FIG. 6, the processing for predicting a rasterization completion time in S303 will be described below. FIG. 6 is a control flowchart for the processing for predicting a rasterization completion time to be executed by the rasterization-completion-time predicting unit 125.

First, the rasterization-completion-time predicting unit 125 obtains monitoring information 201 stored in the rasterization monitoring unit 126 (S501).

The rasterization-completion-time predicting unit 125 calculates an actual rasterization speed (actual value of the rasterization speed) of each of the rasterizing units 130 as a tendency value by using the rasterization speed history 203 in the monitoring information 201 (S502). The actual rasterization speed may be calculated by using a publicly known tendency analysis scheme for time-series data. According to this embodiment, an average value (moving average) of values of rasterization speed records in the monitoring information is handled as the actual rasterization speed.

Next, based on the actual rasterization speed, the rasterization completion time is determined. According to this embodiment, the number of incomplete pages is divided by the actual rasterization speed to determine the prediction value for the rasterization completion time (S503), and the processing ends. The rasterization completion time is calculated for each of the rasterizing units 130. According to this embodiment, the prediction value for the rasterization completion time is calculated based on the actual rasterization speed. However, the present invention is not limited thereto. For example, the prediction value may be determined based on a table describing relationships among the numbers of incomplete pages, actual rasterization speeds and prediction values for the rasterization completion time. Here, when the rasterizing unit 130 has an idle state and there is no incomplete page, the number of incomplete pages 204 is equal to zero. Therefore, the actual rasterization speed is also equal to zero.

Figure 7:
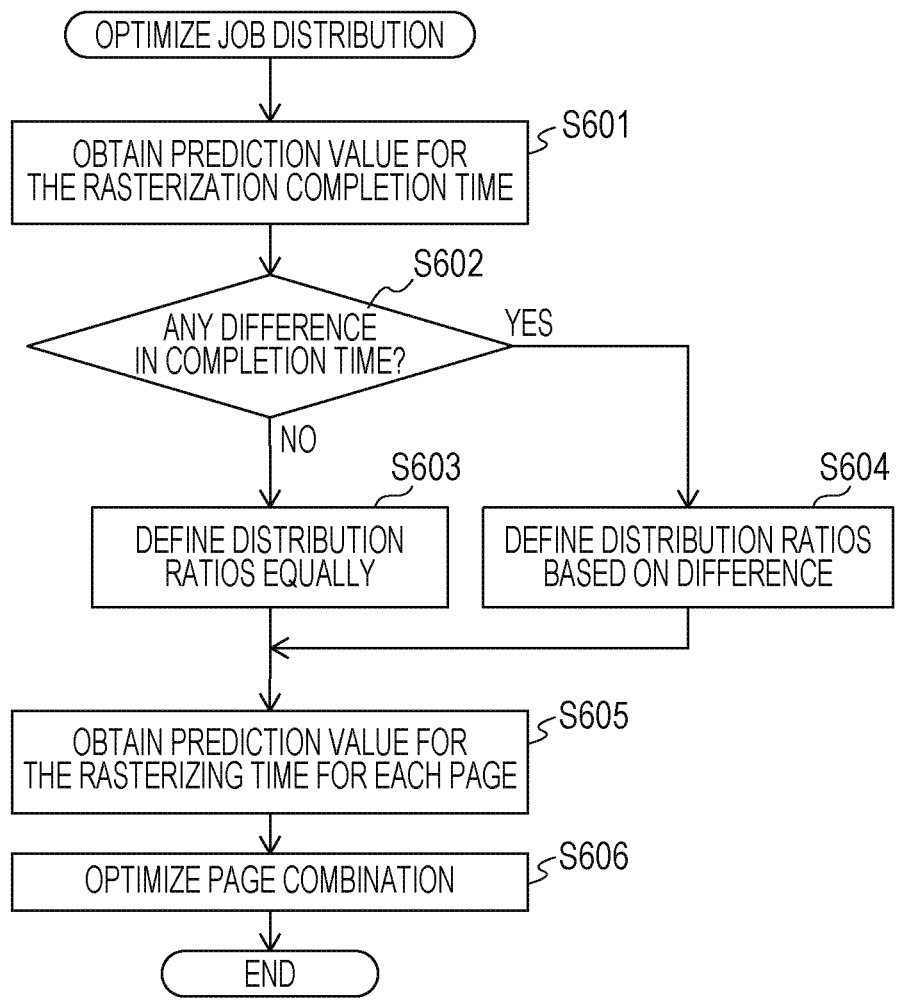
FIG. 7 is a flowchart illustrating a flow of a job distribution optimization process according to the first embodiment.

With reference to FIG. 7, the processing for optimizing job distribution in S304 will be described next. FIG. 7 is a control flowchart for the job distribution optimization processing to be executed by the job distributing unit 123. The job distributing unit 123 obtains prediction values for the rasterization completion times for all rasterizing units 130 (four rasterizing units in this embodiment) identified in the rasterization-completion-time predicting unit 125 (S601).

Next, the job distributing unit 109 judges whether there is a difference between prediction values for rasterization completion times between the plurality of rasterizing units 130 or not (S602).

If not (No in S602), the job distributing unit 123 equally sets the distribution ratios of jobs to the rasterizing units 130 (S603). The case where no difference exists between the rasterization completion times occurs when all of the rasterizing units 130 have an idle state or when it is predictable that the completion times of the rasterization currently in processing may be appropriately equal among all of the rasterizing units 130. Thus, by equally distributing print jobs to the rasterizing units 130 such that the respective rasterizing times can be equal, the rasterization of the print jobs may complete appropriately at the same time in the rasterizing units 130.

If there is a difference on the other hand (Yes in S602), the job distributing unit 123 sets different distribution ratios in accordance with the prediction values for the rasterization completion times of the rasterizing units 130 (S604). More specifically, the distribution ratios are set such that the difference in completion time which is predicted to occur upon end of rasterization of the currently incomplete pages can be cancelled when the rasterization of the print jobs to be currently distributed ends. In other words, a low distribution ratio of print jobs is set to a rasterizing unit predicted to finish its rasterization later while a high distribution ratio of print jobs is set to a rasterizing unit predicted to finish the rasterization earlier.

Next, the job distributing unit 123 obtains a prediction value for the rasterizing time for each page acquired in the job load predicting unit 122 (S605).

The job distributing unit 123 generates a page group for each of the rasterizing units 130 based on the corresponding prediction value for the rasterizing time and the set distribution ratio (S606). Here, the group is generated for an optimized combination of pages and, more specifically, such that the ratios of the prediction values for rasterizing times between page groups can be appropriately equal to or slightly different from the distribution ratios. In other words, based on the prediction values for the rasterizing times and the distribution ratios, page groups to be allocated to the rasterizing units 130 are generated such that the difference between the rasterization completion times of the rasterizing units 130 can be small.

It should be noted that the order of S601 to S604 and S605 is not limited thereto but they may be performed in reverse order.

Figure 13A:
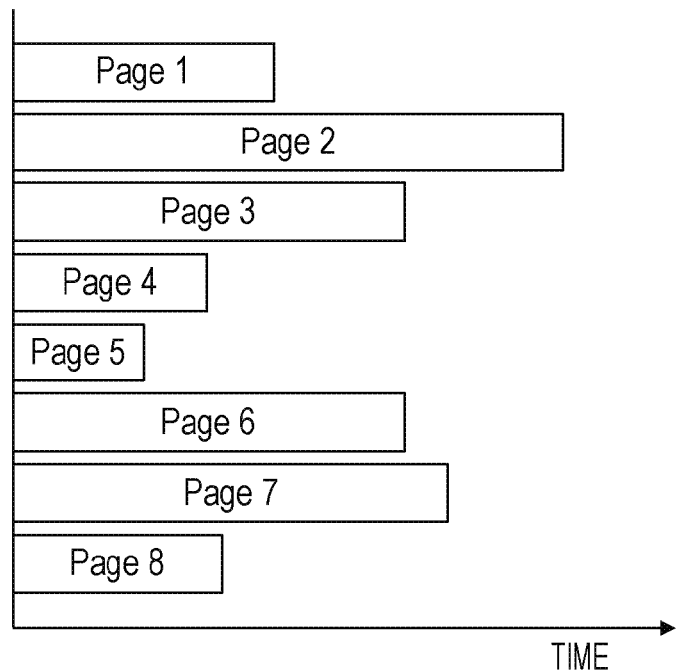
FIGS. 13A and 13B illustrate a job distribution process according to the first embodiment.
Figure 13B:
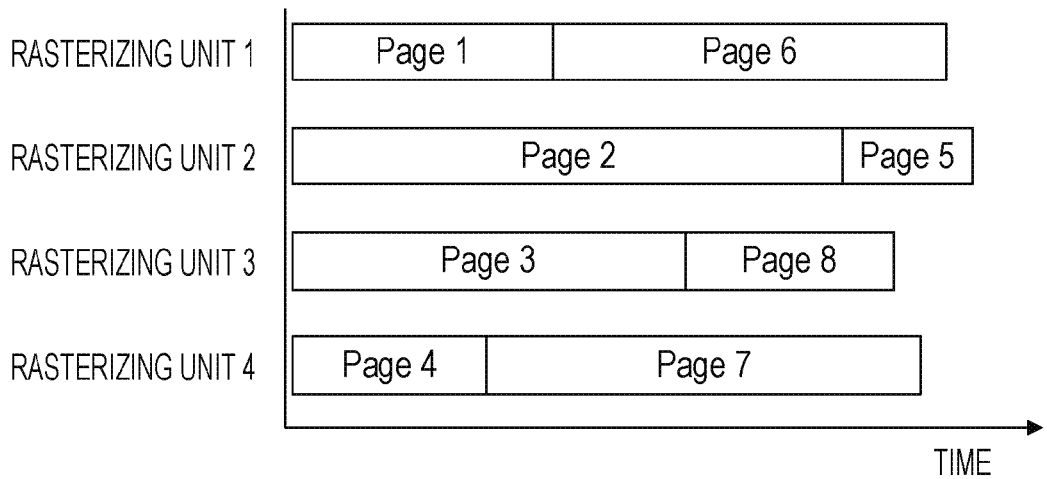

The optimization processing in S606 will be described with reference to a case where a print job contains eight pages and four rasterizing units 130 are provided, as an example. A case will be described where different prediction values are acquired for the rasterizing times for each page in S605, as illustrated in FIG. 13A, and a distribution ratio of 25% is set for each of the rasterizing units 130. In this case, because the rasterizing units 130 have an equal distribution ratio, the page groups are optimized as illustrated in FIG. 13B. In other words, pages are allocated to the rasterizing units 130 that the prediction value for the rasterizing time of a page group, that is, the sum value of prediction values of the rasterizing times for pages contained in the page group can be appropriately equal among the rasterizing units 130. In a case where different distribution ratios are set for the rasterizing units 130, pages are allocated to the rasterizing units 130 in accordance with the distribution ratios such that the rasterization of page groups in the rasterizing units can complete at the same time or that the difference between the rasterization completion times can be small. In other words, the optimization processing here refers to processing for allocating pages to a plurality of rasterizing units such that the difference in processing completion time can be small between the rasterizing units.

According to this embodiment, as illustrated in FIG. 13B, the rasterizing units 130 are set to start the rasterization from a page having a smaller page number.

There may be a possibility that the completion times of the rasterization processes on print jobs may vary because the rasterization processes may not necessarily complete at the same time, as illustrated in FIG. 13B. According to this embodiment, the next print job is distributed in consideration of such a variation.

With reference to FIG. 5, a flow of second processing for receiving data from the rasterizing unit 130 by the job control unit 120 will be described.

The communication unit 124 receives bitmap data of pages having undergone the rasterization from the rasterizing units 130 (S401).

The communication unit 124 having received the bitmap data instructs the rasterization monitoring unit 126 to update the monitoring information 201. Thus, the rasterization monitoring unit 126 obtains the processing states of the rasterizing units 130 and updates the monitoring information (S402).

The communication unit 124 stores the bitmap data received in S401 in the spool unit 127 (S403). The job control unit 120 transmits the bitmap data and its header information within the spool unit 127 to the printer engine unit 150 in printing order (S404).

The communication unit 124 judges whether there is bitmap data left or not (S405). If so (Yes in S405), the processing returns to S401. If not (No in S405), the processing ends. The order of S402 and S403 is not limited thereto, but they may be performed in reverse order.

Figure 8:
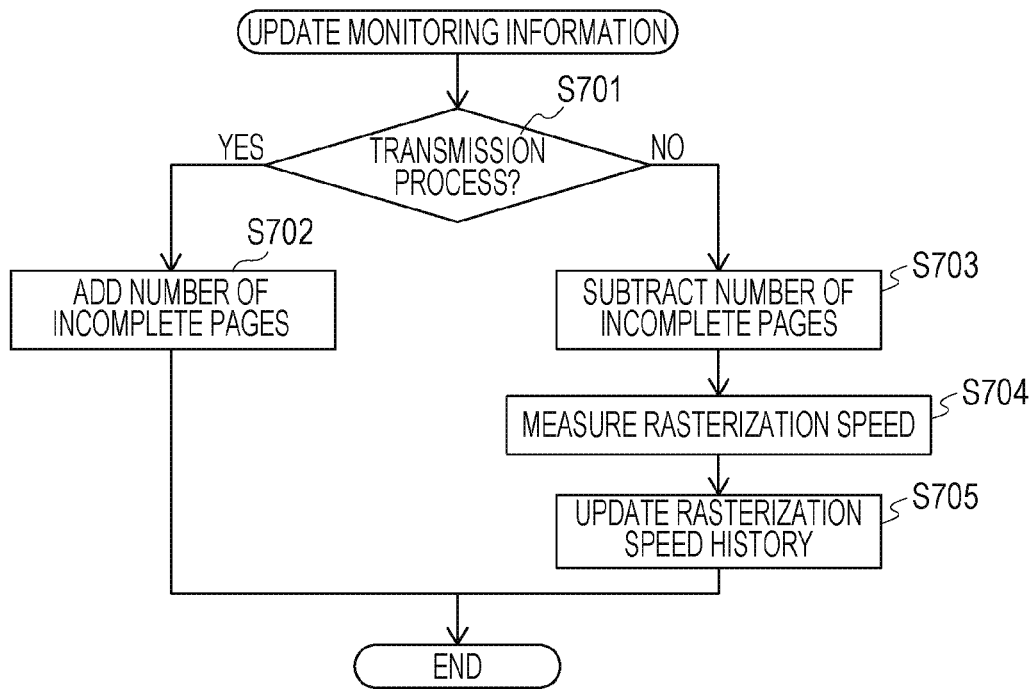
FIG. 8 is a flowchart illustrating a monitoring information update process according to the first embodiment.

Here, with reference to FIG. 8, the processing for updating monitoring information in S306 and S402 will be described.

The rasterization monitoring unit 126 judges whether the job control unit 120 is currently performing the processing for transmitting data to the rasterizing unit 130 or not (S701).

If the processing for transmitting data, that is, the first processing illustrated in FIG. 4 is being performed (Yes in S701), the rasterization monitoring unit 126 increments the number of incomplete pages 204 of all of the rasterizing units 130 (S702). The number to be incremented is a number of pages transmitted to the rasterizing units 130.

On the other hand, if the processing for receiving, that is, the second processing illustrated in FIG. 5 is being performed (No in S701), the rasterization monitoring unit 126 decrements the number of incomplete pages 204 of the rasterizing unit 130 having transmitted the bitmap data (S703). Because the bitmap data receiving process in S401 is performed in pages, the number to be decremented is 1. The rasterization monitoring unit 126 measures the rasterization speed of the rasterizing unit 130 having transmitted the bitmap data (S704). More specifically, the rasterization monitoring unit 126 measures the rasterization speed by acquiring the reciprocal number of a difference between the last bitmap data reception time from the rasterizing unit 130 having transmitted the bitmap data and the current bitmap data reception time from the rasterizing unit.

The rasterization monitoring unit 126 updates the rasterization speed history 203 in the rasterizing unit 130 having transmitted the bitmap data (S705). Because the rasterization speed history 203 stores the latest record, the oldest record is deleted from the history, and the latest measurement result is added. A case will be described in which N=3 and bitmap data are received from a rasterizing unit and a speed of 1.5 (page/sec) is measured. When the first row, Column v0 has "1.0" and the first row, Column v1 has "1.1", the history 203 deletes the value at the first row, Column v3, changes the value at the first row, Column v2 to "1.1", the value at the first row, Column v1 to "1.0", and the value at the first row, Column v0 to "1.5" which is the current measurement result. As described above, the value at a column $v_i$ in the rasterization speed history 203 is replaced by the value at a column $v_{i-1}$, and the value at a column $v_0$ is replaced by the result of the measurement in S704. Here, i is an integer in a range of 1 through N−1.

Figure 9:
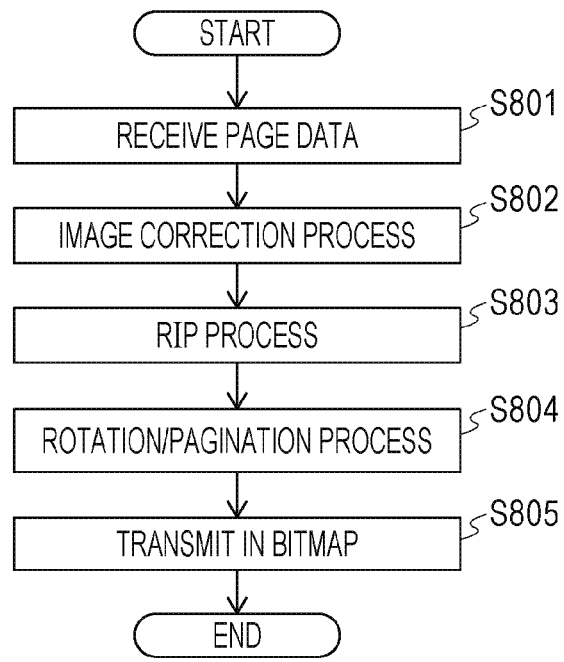
FIG. 9 is a flowchart illustrating processing in the rasterizing unit according to the first embodiment.

With reference to FIG. 9, a flow of processing in each of the rasterizing units 130 will be described. The processing illustrated in FIG. 9 may be implemented by the CPU 101 by reading out and executing a program stored in the ROM 102 to and in the RAM 103.

The communication unit 131 receives commands and page data transmitted from the job control unit 120 (S801). The image processing unit 132 causes the image correction processing unit 133, RIP processing unit 134, and rotation/pagination processing unit 135 to execute the corresponding processes in accordance with the respective commands to generate printing bitmap data for a page (S802 to S804).

The communication unit 131 transmits the printing bitmap data to the communication unit 131 within the job control unit 120 (S805). As described above, within each of the rasterizing units 130, the image correction process, RIP process, rotation/pagination process and so on are performed in pages, and different types of processing are executed in parallel on different pages.

Figure 10:
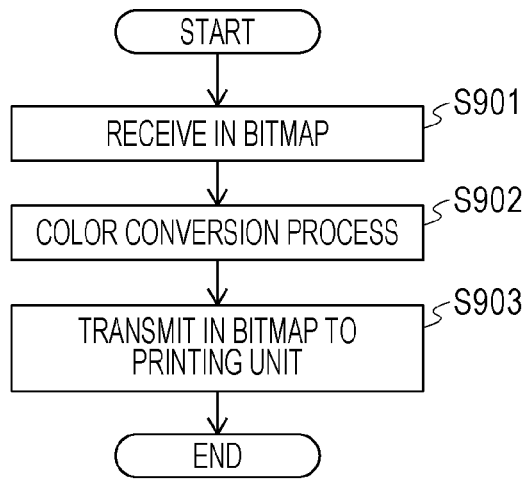
FIG. 10 is a flowchart illustrating processing in a printer engine unit according to the first embodiment.

With reference to FIG. 10, a flow of processing to be performed by the printer engine unit 150 will be described. The processing illustrated in FIG. 10 may be implemented by the CPU 101 by reading out and executing programs stored in the ROM 102 to and in the RAM 103, for example.

The printer engine unit 150 receives bitmap data from the job control unit 120 (S901). Based on the content of the header information attached to the received bitmap data, the printer engine unit 150 performs color conversion processing and binarization processing on the data as required (S902). The header information holds information indicative of a monochrome black mode or a color mode of the data. The color conversion processing uses different color conversion tables for the color mode and the monochrome black mode.

The printer engine unit 150 transmits the data having undergone the color conversion processing to the printing unit (recording unit 105) (S903), and the processing ends.

Figure 11:
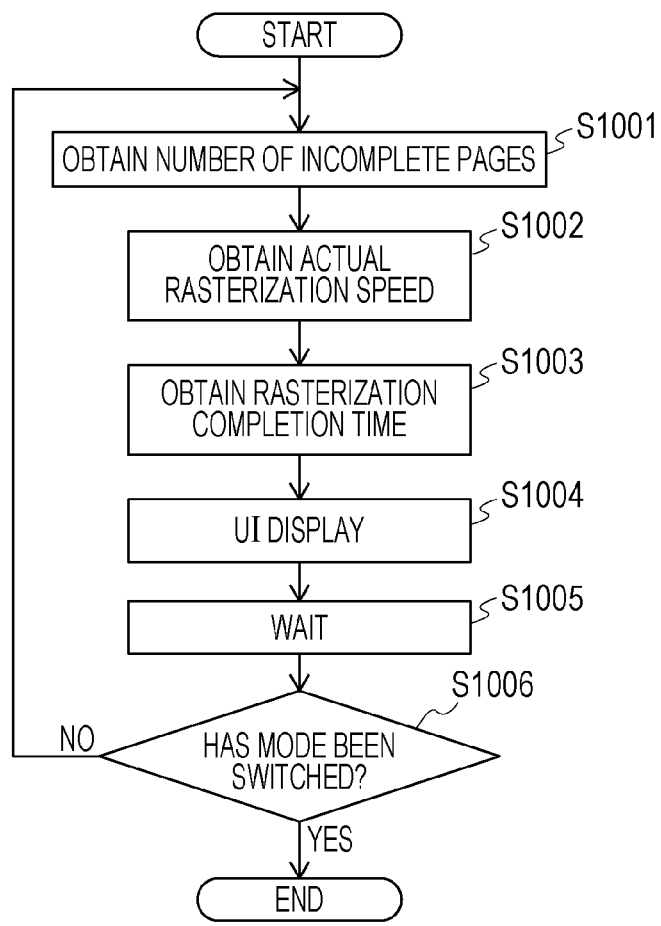
FIG. 11 is a flowchart illustrating processing in a user interface unit according to the first embodiment.

With reference to FIG. 11, a flow of processing to be performed in the user interface unit 140 will be described. The processing illustrated in FIG. 11 may be executed by the CPU 101 by reading out a program stored in the ROM 102 to the RAM 103, for example.

The user interface unit 140 is capable of presenting various indications as designed and is capable of presenting a status indication of a print job and a displaying a menu in accordance with a selected display mode. Next, control will be described which displays processing states of the rasterizing units 130 on the display unit 107 based on the monitoring information 201.

The user interface unit 140 obtains the number of incomplete pages 204 in the monitoring information 201, the actual rasterization speed acquired by the rasterization-completion-time predicting unit 125, and the rasterization completion time prediction value (S1001 to S1003). The order of obtaining them is not limited thereto.

The user interface unit 140 displays a table on the display unit 107 in the user interface unit 140 (S1004). FIG. 14 illustrates a table to be displayed on the display unit 107. As illustrated in FIG. 14, according to this embodiment, rasterizing unit numbers, processing speed (ppm), the number of pages left, and the remaining time (sec) are displayed as processing states of the rasterizing units 130. The processing speed, the number of pages left and the remaining time are to be updated sequentially with the latest information.

The user interface unit 140 waits for several ms, for example (S1005) and then judges whether the display mode has been changed or not (S1006). For example, when an instruction to change the display mode is given from a user, it is judged that the display mode has been changed. The instruction to change the display mode from a user may be an instruction to display a screen different from the menu display, for example.

If the display mode has not been changed (No in S1006), the processing returns to S1001, and the processing states of the rasterizing units 130 are displayed then. If not on the other hand (Yes in S1006), the processing ends.

Figure 15A:
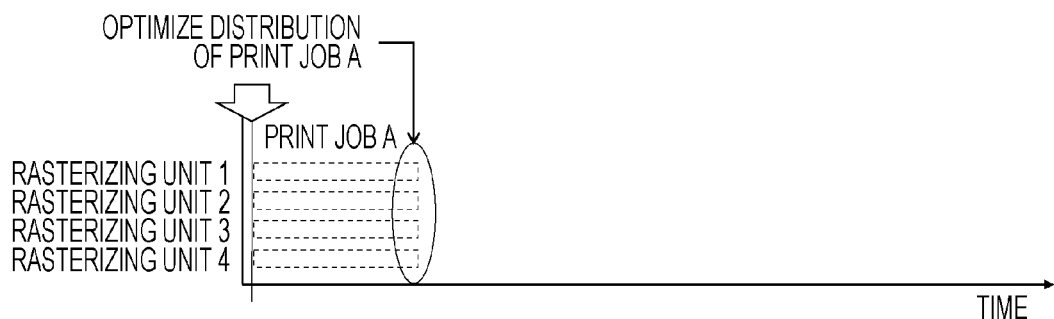
FIGS. 15A to 15C illustrate exemplary time charts for rasterizing units based on the distribution processing according to the first embodiment.
Figure 15B:
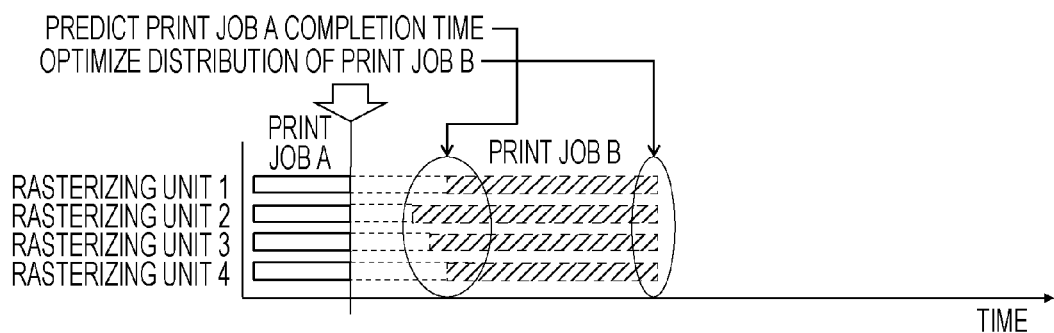
Figure 15C:
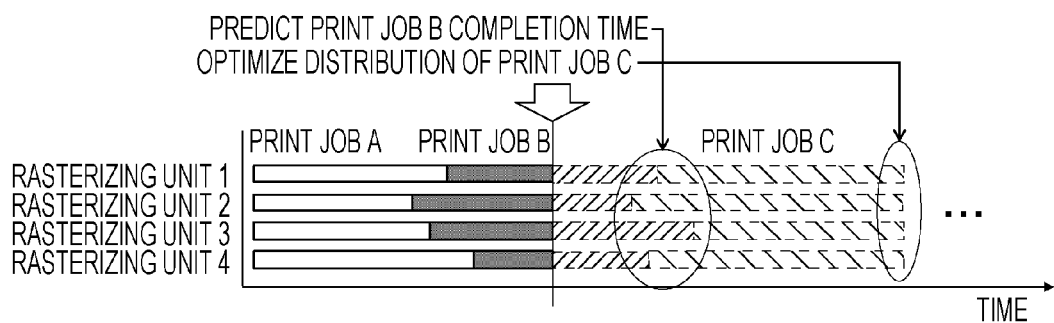

According to this embodiment, FIGS. 15A to 15C illustrate exemplary time charts for rasterizing units in a case where print jobs are serially processed. In FIGS. 15A to 15C, the broken lines indicate prediction values, and solid lines indicate times taken by the actual processing.

As illustrated in FIG. 15A, a print job A is first distributed to the rasterizing units. Because the prediction values for the completion times of the rasterizing units 130 are all initially equal to zero, an equal distribution ratio is set, and page groups are generated such that the rasterizing times of the rasterizing unit 130 can be appropriately equal.

After the rasterizing of a print job A is started in each of the rasterizing units 130, the distribution processing is performed on a print job B. Here, as illustrated in FIG. 15B, when the time passes to the position indicated by the arrow, the rasterization completion time for the job in processing is predicted for each of the rasterizing units 130. Here, actually executing the rasterizing process as illustrated in FIG. 15B, the rasterization completion time is different from the initial prediction. As a result, a difference may occur in rasterization completion time between the rasterizing processes. According to this embodiment, the distribution ratio is defined in accordance with the ratio of the rasterization completion time in consideration of a difference in rasterization completion time between rasterizing processes. The distribution ratio is defined so as to cancel the difference in rasterization completion time when the rasterization on the print job B completes. The distribution ratio may be defined based on the difference from the rasterization completion time.

After that, as illustrated in FIG. 15C, the same processing is repeated on the subsequent print jobs.

According to this embodiment, the rasterization completion times are predicted based on processing states of the rasterizing units, and the distribution ratios of the print job are optimized in consideration of a difference in completion time between rasterizing units. In other words, while the rasterizing units are executing rasterizing processes on print jobs, the rasterization completion times are predicted based on the processing states of the rasterizing units. The distribution ratios of the next print job is determined such that the difference in completion time between the rasterizing units can be small. Thus, even when an error occurs in a predicted rasterizing time, the rasterizing time for rasterizing a plurality of print jobs may be reduced.

Second Embodiment

According to a second embodiment, the timing for performing the distribution processing by the job distributing unit 123 is controlled. The rest of the configuration of the printer is the same as that of the first embodiment, and the description therefore will be omitted. Like numbers refer to like parts to those in the first embodiment.

Figure 12:
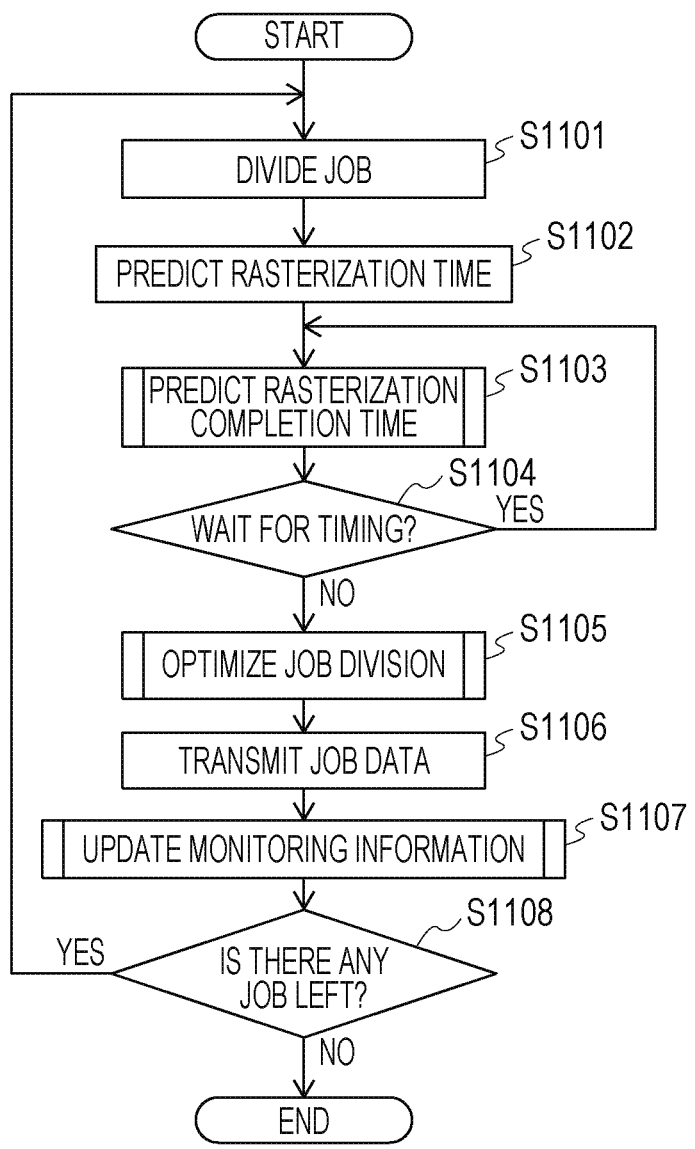
FIG. 12 is a flowchart illustrating a flow of the first processing according to the first embodiment.

With reference to FIG. 12, processing for passing data from the job control unit 120 to the rasterizing unit 130 according to this embodiment will be described. Because the other processing flows are the same as those of the first embodiment, the description will be omitted.

The job dividing unit 121 divides a print job into units of processing (pages according to this embodiment) of the rasterizing units 130 (S1101).

The job load predicting unit 122 analyzes each page data piece and predicts a time necessary for rasterizing the page data (S1102). Because the prediction method is the same as that applied in S302, the description will be omitted.

The rasterization-completion-time predicting unit 125 predicts rasterization completion times of the rasterizing units 130 (S1103).

The job distributing unit 123 judges whether the processing waits for the timing or not (S1104). The judgment of whether the processing waists for the timing or not will be described in detail below.

If the processing waits for the timing (Yes in S1104), the processing returns to S1103.

If not on the other hand (No in S1104), the job distributing unit 123 generates a page group for each of the rasterizing units 130 to optimize the distribution of pages (S1105). Because the processing in S1105 is the same as that in S304, the detail description will be omitted.

The communication unit 124 transmits data of the page group to the corresponding one of the rasterizing units 130 (S1106).

The communication unit 124 instructs the rasterization monitoring unit 126 to update the monitoring information 201 (S1107).

The job dividing unit 121 judges whether there is a print job left or not (S1108). If there is a print job left (Yes in S1108), the processing returns to S1101. Then, the processing is performed on the next print job. If there is no print job left on the other hand (No in S1108), the processing ends.

The method for judging whether the processing waits for the timing or not in S1104 will be described below.

First, a minimum value of prediction values for the rasterization completion times of a plurality of rasterizing units 130 acquired in S1103 and a predetermined threshold value are compared. The threshold value may be determined in consideration of the time period taken from the generation of a page group by the job control unit 120 in S1105 to the actual start of the rasterization on at least one page belonging to the page group by the rasterizing unit 130, for example. The threshold value may be set to be equal to a value equivalent to the time period taken from the generation of a page group by the job control unit 120 to the start of the rasterization or a value acquired by adding a predetermined time period to the equal value, for example. The time period taken for generation of data of a page group may vary in accordance with the number of pages of a print job and the type of the data, for example. In other words, the time period may vary in accordance with the data size of a print job. Therefore, the threshold value may be a fixed value with a margin by assuming a case where the data size of a print job is large or may be set properly for each print job based on the data size.

If the minimum value of the prediction values is higher than the set threshold value, it is judged that the processing waits for the timing. If the minimum value of the prediction values is equal to or lower than the set threshold value, it is judged that the processing does not wait for the timing.

According to this embodiment, the data of page groups may be transmitted to the rasterizing units 130 as late as possible. This allows more accurate prediction of the rasterization completion times by the rasterization-completion-time predicting unit 125 in the job control unit 120. This is because the processing states of the rasterizing units 130 may sequentially change in a case where print jobs are rasterized sequentially. When a print job is transmitted to the rasterizing units 130 early, there is a possibility that the state of the rasterizing units 130 may change largely between the time point when the distribution of print jobs is optimized and the time point when the rasterization of the print jobs are started. On the other hand, according to this embodiment, the latest processing states of the rasterizing devices may be reflected on the distribution of print jobs so that the stop of execution of the processing in the rasterizing units 130 may be inhibited and the rasterization completion times may be predicted more accurately in the job control unit 120.

According to this embodiment, the parallel distribution processing for rasterization may be implemented efficiently. More specifically, even when an error occurs in predicted rasterizing times, the rasterizing times may be reduced when rasterization processing is performed on a plurality of print jobs.

Other Embodiments

It should be understood that the present invention is not limited to the aforementioned embodiment. For example, according to the aforementioned embodiment, the rasterization-completion-time predicting unit 125 handles a page as a processing unit and predicts the completion times of processing in rasterizing units based on the rasterization speed history (page/sec) and the number of incomplete pages. However, the present invention is not limited thereto. When a band is handled as the processing unit, the completion time of the processing in rasterizing units may be predicted based on the rasterization speed history (band/sec) and the number of incomplete bands. The rasterization completion times may be predicted based on processing states of rasterizing units. For example, the rasterization completion times may be predicted based on the rasterization speed history and the amount of incomplete processing such as the number of incomplete pages or bands.

According to the aforementioned embodiments, the control apparatus has a plurality of image processing units (rasterizing units). The present invention is not limited thereto, but the control apparatus may be an external apparatus to the image processing units. For example, the control apparatus may be an external apparatus such as a PC connecting to a printing apparatus having a plurality of image processing units. Alternatively, the printing apparatus may have the control apparatus, or an external apparatus connecting to the printing apparatus may have image processing units.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-233130, filed Nov. 17, 2014, which is hereby incorporated by reference herein in its entirety.

What is claimed is:

1. A control apparatus comprising: a first predicting unit configured to predict a rasterizing time for each of a plurality of predetermined units of processing of a predetermined print job; an allocating unit configured to allocate a plurality of divided jobs acquired by dividing the predetermined print job into the units of processing to a plurality of rasterizing units configured to perform image processing; an acquiring unit configured to acquire an actual value of a rasterization speed of each of the rasterizing units; a second predicting unit configured to predict a completion time of rasterization processing of a precedent print job in each of the rasterizing units based on the actual value of the rasterization speed of each of the rasterizing units acquired by the acquiring unit and a processing state of each of the rasterizing units after start of the rasterization processing of the precedent print job, a plurality of divided jobs based on the precedent print job having been allocated to the plurality of rasterizing units before the plurality of divided jobs based on the predetermined print job are allocated by the allocating unit; a determination unit configured to determine whether the shortest predicted completion time predicted by the second predicting unit is shorter than a threshold value, wherein the allocating unit divides the predetermined print job into a plurality of divided jobs and allocates the divided jobs to each of the rasterizing units so as to reduce a difference in completion time of processing in the rasterizing units based on the prediction results provided by the first predicting unit and the prediction results provided by the second predicting unit, wherein the allocating unit allocates the divided jobs of the predetermined print job to each of the rasterizing units without waiting processing if it is determined that the shortest predicted completion time of the precedent print job is shorter than the threshold value, whereas allocates the divided jobs of the predetermined print job to each of the rasterizing units after the waiting processing if it is determined that the shortest predicted completion time of the precedent print job is not shorter than the threshold value, and wherein the first predicting unit, the allocating unit, the second predicting unit, and the determination unit are implemented by a processor.

2. The control apparatus according to claim 1, wherein the second predicting unit performs prediction while the rasterizing units are executing processing on the precedent print job.

3. The control apparatus according to claim 1, wherein the second predicting unit predicts the completion times of processing based on the rasterization speeds of the rasterizing units acquired by the acquiring unit and the amounts of incomplete processing in the rasterizing units.

4. The control apparatus according to claim 1, further comprising:

a memory unit configured to store processing states of the rasterizing units; and
an updating unit configured to update the processing states stored in the memory unit every time when the units of processing complete rasterization.

5. The control apparatus according to claim 1, wherein the rasterizing units generate bitmap data from print data.

6. The control apparatus according to claim 1, further comprising the rasterizing units.

7. The control apparatus according to claim 1, further comprising a transmitting unit configured to transmit data processed by the rasterizing units to a printing unit.

8. The control apparatus according to claim 1, wherein the first predicting unit predicts the rasterizing time based on at least one of the size of data, the resolution of the data, and the type of the data.

9. The control apparatus according to claim 1, further comprising the printing unit.

10. A control method comprising:

predicting a rasterizing time for each of a plurality of predetermined units of processing of a predetermined print job;
allocating divided jobs acquired by dividing the predetermined print job into the units of processing to a plurality of rasterizing units configured to perform image processing;
acquiring an actual value of a rasterization speed of each of the rasterizing units;
predicting a completion time of rasterization processing of a precedent print job in each of the rasterizing units based on the actual value of the rasterization speed of each of the rasterizing units acquired by the acquiring and a processing state of each rasterizing unit after start of the rasterization processing on the precedent print job, a plurality of divided jobs based on the precedent print job having been allocated to the plurality of rasterizing units before the predetermined print job are allocated; and
determining whether the shortest predicted completion time predicted is shorter than a threshold value,
wherein the allocating divides and allocates the predetermined print jobs into a plurality of divided jobs and allocate the divided jobs to each of the rasterizing units so as to reduce a difference in completion time of processing in the rasterizing units based on the prediction results provided by the first predicting and the prediction results provided by the second predicting,
wherein the divided jobs of the predetermined print jobs are allocated to each of the rasterizing units without waiting processing if it is determined that the shortest predicted completion time of the precedent print job is shorter than the threshold value, whereas the divided jobs of the predetermined print jobs are allocated to each of the rasterizing units after waiting processing if it is determined that the shortest predicted completion time of the precedent print job is not shorter than the threshold value.

11. A non-transitory computer-readable recording medium storing a program causing a computer to execute:

predicting a rasterizing time for each of a plurality of predetermined units of processing of a predetermined print job;
allocating divided jobs acquired by dividing the predetermined print job into the units of processing to a plurality of rasterizing units configured to perform image processing;

acquiring an actual value of the rasterization speed of each of the rasterizing units;

predicting completion times of rasterization processing of a precedent print job in each of the rasterizing units based on the actual value of the rasterization speed of each of the rasterizing units acquired by the acquiring and a processing state of each of the rasterizing units after start of the rasterization processing of the precedent print job, a plurality of divided jobs based on the precedent print job being allocated to the plurality of rasterizing units before the predetermined print job are allocated; and determining whether the shortest predicted completion time predicted is shorter than a threshold value, wherein the allocating divides the predetermined print job into a plurality of divided jobs and allocates the divided jobs to each rasterizing unit so as to reduce a difference in completion time of processing in the rasterizing units based on the prediction results provided by the first predicting and the prediction results provided by the second predicting, wherein the divided jobs of the predetermined print jobs are allocated to each of the rasterizing units without waiting processing if it is determined that the shortest predicted completion time of the precedent print job is shorter than the threshold value, whereas the divided jobs of the predetermined print jobs are allocated to each of the rasterizing units after waiting processing if it is determined that the shortest predicted completion time of the precedent print job is not shorter than the threshold value.

12. The control apparatus according to claim 1, wherein the predetermined processing unit is a page.

13. The control apparatus according to claim 1, wherein a first divided job and a second divided job to be allocated to a first rasterizing unit are not consecutive.

14. The control apparatus according to claim 1, wherein an actual value of a rasterization speed of each of the rasterizing units is an average value of a rasterization speed history.

* * * * *